United States Patent
Ring et al.

(10) Patent No.: US 8,920,860 B2
(45) Date of Patent: Dec. 30, 2014

(54) SODA MACHINE PRONGED CLAMP

(75) Inventors: Allan Ring, Mercaz Shapira (IL); Avi Cohen, Jerusalem (IL); Doron Krom, Zikhron Yaacov (IL); Hagai Harduff, Binyamina (IL); Amit Avigdor, Moshav Nizaney Oz (IL)

(73) Assignee: SodaStream Industries Ltd., Ben Gurion Airport (IL)

( * ) Notice: Subject to any disclaimer, the term of this patent is extended or adjusted under 35 U.S.C. 154(b) by 258 days.

(21) Appl. No.: 13/570,294

(22) Filed: Aug. 9, 2012

(65) Prior Publication Data
US 2013/0037969 A1 Feb. 14, 2013

Related U.S. Application Data

(60) Provisional application No. 61/521,794, filed on Aug. 10, 2011, provisional application No. 61/624,306, filed on Apr. 15, 2012.

(51) Int. Cl.
*B01F 3/04* (2006.01)
(52) U.S. Cl.
CPC .................................. *B01F 3/04794* (2013.01)
USPC ........................... 426/477; 99/323.1; 312/31.2
(58) Field of Classification Search
USPC ................. 426/474, 477; 99/323.1; 312/31.2; 261/DIG. 7
See application file for complete search history.

(56) References Cited

U.S. PATENT DOCUMENTS

| 4,304,741 | A  | 12/1981 | Avison et al. |
| 4,610,282 | A  | 9/1986  | Brooks et al. |
| 7,975,988 | B2 | 7/2011  | Thomson et al. |

FOREIGN PATENT DOCUMENTS

| GB | 2200571    | 8/1988  |
| WO | 2007138045 | 12/2007 |

*Primary Examiner* — Robert A Hopkins
(74) *Attorney, Agent, or Firm* — Eitan, Mehulal & Sadot

(57) ABSTRACT

A pronged clamp apparatus for attaching a soda bottle to a soda machine includes prongs to attach the bottle to the soda machine and a locking mechanism to lock the bottle to the machine at least during carbonation. The apparatus also comprises a flexible seal to facilitate a closed carbonation environment and a ring to constrict the prongs underneath a ringed extension of the bottle thereby lifting the bottle towards the seal to clamp the bottle to the flexible seal.

8 Claims, 12 Drawing Sheets

SODA MACHINE PRONGED CLAMP

CROSS-REFERENCE TO RELATED APPLICATIONS

This application claims priority from U.S. provisional patent applications 61/521,794, filed Aug. 10, 2011, and 61/624,306, filed Apr. 15, 2012, both of which applications are incorporated herein by reference.

FIELD OF THE INVENTION

The present invention relates to carbonation machines generally and to clamping devices for attaching bottles to the machines in particular.

BACKGROUND OF THE INVENTION

Soda machines for the carbonation of beverages are known in the art. Most such devices for home carbonation are designed for manual operation; typically comprising a manually operated gas release valve to release $CO_2$ into a closed bottle of water from an attached pressurized cylinder. Such machines typically also comprise one or more safety pressure release valves which are designed to vent if excess pressure builds up during the carbonization process.

For example, U.S. Pat. No. 7,975,988, hereby incorporated in its entirety by reference, discloses a carbonation assembly with two pressure release valves. The first valve is designed to vent with an audible sound at a level of pressure consistent with the maximum processing pressure. The second release valve is designed to vent at a higher level of pressure as a safety measure in case the first valve malfunctions and/or for whatever reason $CO_2$ continues to flow into the bottle uncontrolled and the pressure rises past the recommended level for safe operation.

SUMMARY

There is provided, in accordance with an embodiment of the present invention, a pronged clamp apparatus for attaching a soda bottle to a soda machine, the apparatus comprising prongs to attach the bottle to the soda machine; and a locking mechanism to lock the bottle to the machine at least during carbonation.

In accordance with an embodiment of the present invention, the apparatus also comprises a flexible seal to facilitate a closed carbonation environment and a ring to constrict the prongs underneath a ringed extension of the bottle thereby lifting the bottle towards the seal to clamp the bottle to the flexible seal.

In accordance with an embodiment of the present invention, the locking mechanism is a mechanical stop.

In accordance with an embodiment of the present invention, the mechanical stop is a recessed area in a cam of the soda machine, the recessed area receiving an activator pin connected to the pronged clamp during the carbonation.

In accordance with an embodiment of the present invention, the mechanical stop is a rib of a lever which stops an extension of the pronged clamp from tilting during the carbonation.

In accordance with an embodiment of the present invention, the ringed extension is around a spout of the bottle.

In accordance with an embodiment of the present invention, the ringed extension is near threads around the spout.

In accordance with an embodiment of the present invention, the apparatus also comprises a constricting ring with centering ribs to guide the bottle into the pronged clamp during insertion and to constrict the prongs during operation.

There is provided, in accordance with an embodiment of the present invention, a pronged clamp to fit a bottle to a flexible seal, thereby facilitating a closed carbonation environment in the bottle; and a normally open safety valve to vent the bottle when the machine is not actively carbonating.

In accordance with an embodiment of the present invention, the normally open safety valve comprises a spring normally pushing a pin away from a carbonation path of the machine.

In accordance with an embodiment of the present invention, the home use carbonation machine also comprises a cam to push the pin against the spring to close the path during carbonation.

There is provided, in accordance with an embodiment of the present invention, a home use carbonation machine comprising a carbonation assembly to carbonate liquid with pressurized gas; a pronged clamp to attach a bottle containing the liquid to the machine; and a centering ring with centering ribs to guide the bottle into the pronged clamp during insertion and to constrict prongs of the clamp during operation.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
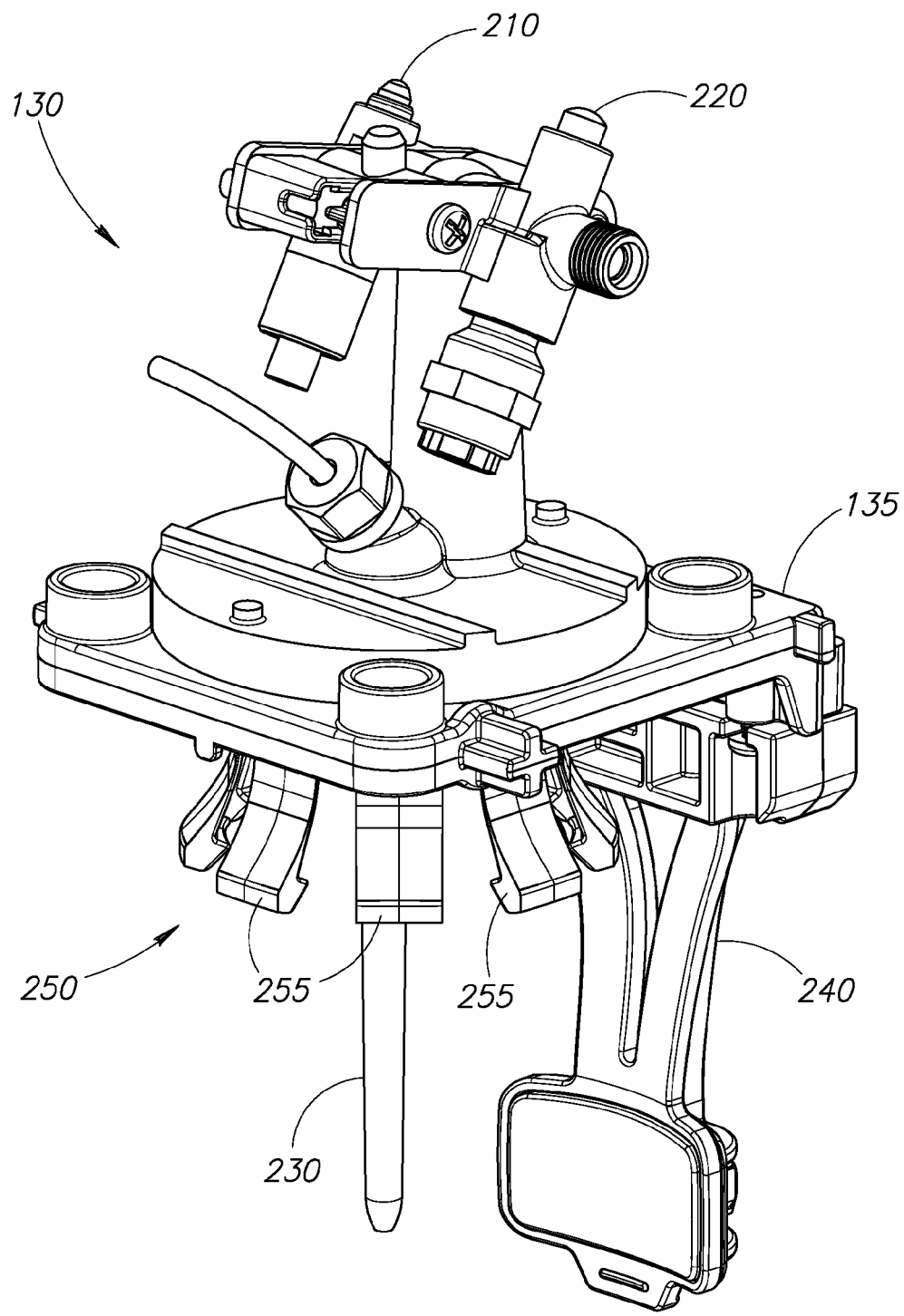
FIG. 1A is an isometric view of a carbonating head assembly with a pronged clamp, constructed and operative in accordance with a preferred embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

It will be appreciated that the standard water bottles that may be used with prior art machines may typically have threaded spouts designed to facilitate screwing on a bottle cap. In the prior art, the bottles may typically be attached to a home soda machine by rotating the bottle several times to "screw in" the threaded spout to a mount on the machine. Applicants have realized that, while this may seem secure, it is an awkward way to mount the bottle.

In accordance with a preferred embodiment of the present invention, a water bottle may be attached to a soda machine via a simple "position and press" process, without requiring any rotational motions, using a flower-like, pronged clamp.

Reference is now made to FIG. 1A which illustrates a carbonation head assembly 130 in accordance with a preferred embodiment of the present invention. Assembly 130 may comprise carbonating heads lower 135, exhaust valve 210, safety valve 220, carbonation injector 230, bottle insertion lever 240 and pronged clamp 250. Pronged clamp 250 may comprise flexible prongs 255 which may be attachable to a bottle. Exhaust valve 210 and safety valve 220 may function in generally the same manner as in the prior art. For example, exhaust valve 210 may be configured to vent at 8 bars of pressure to indicate that the carbonation in a bottle may have reached recommended levels; safety valve 220 may be configured to vent at 11 bars of pressure.

Figure 1B:
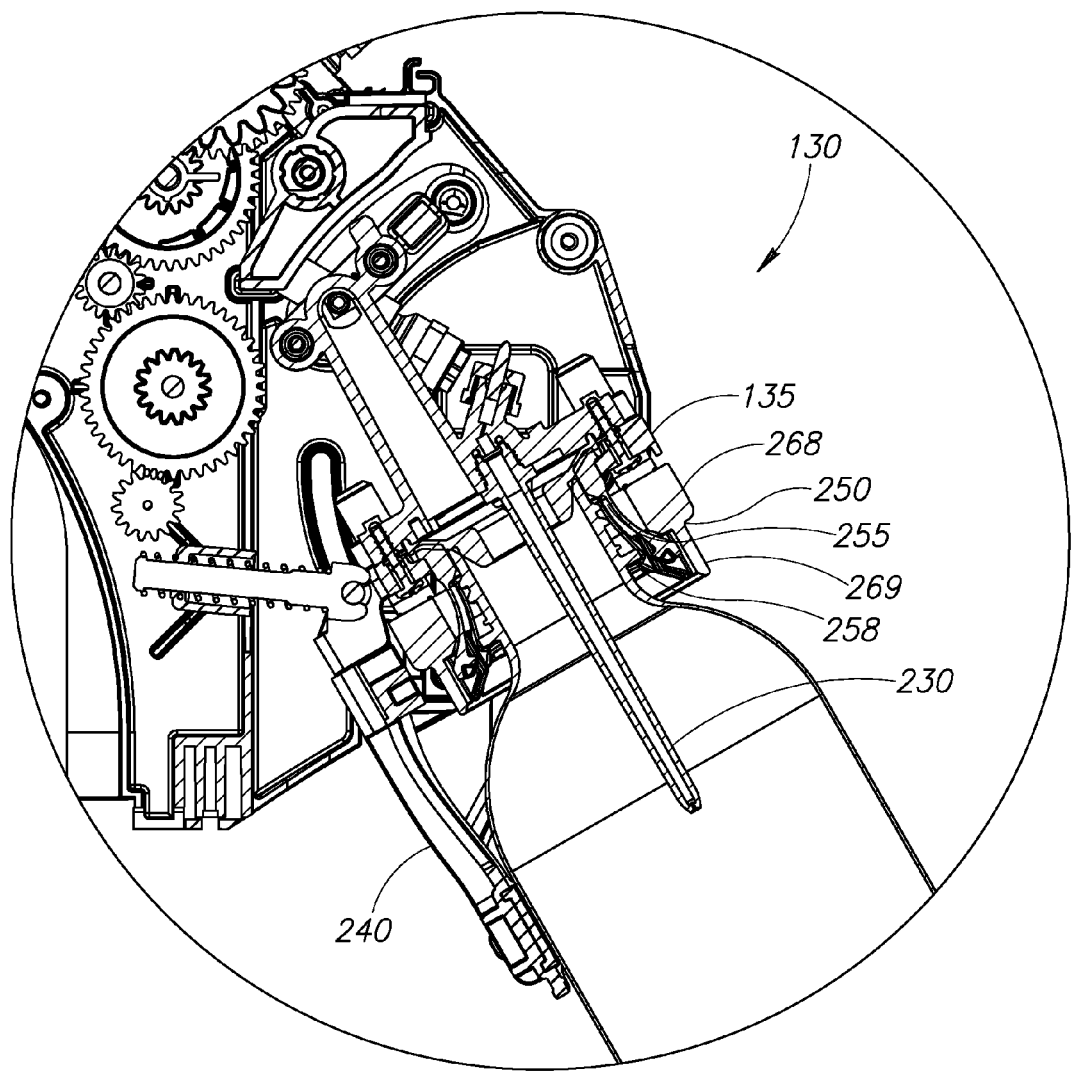
FIG. 1B is a cross-sectional view of the assembly of FIG. 1A in a soda machine.

As illustrated in FIG. 1B to which reference is also made, in operation, a user may insert a water bottle 170 by first positioning it at an angle such that injector 230 extends into bottle 170 while bottle 170 comes in contact with the center of pronged clamp 250 on the underside of carbonating head lower 135. As will be disclosed hereinbelow, once bottle 170 is in position it may be locked into place by pressing it against bottle insertion lever 240 which in turn may cause pronged clamp 250 to clamp on bottle 170 and generally seal its opening.

Figure 1C:
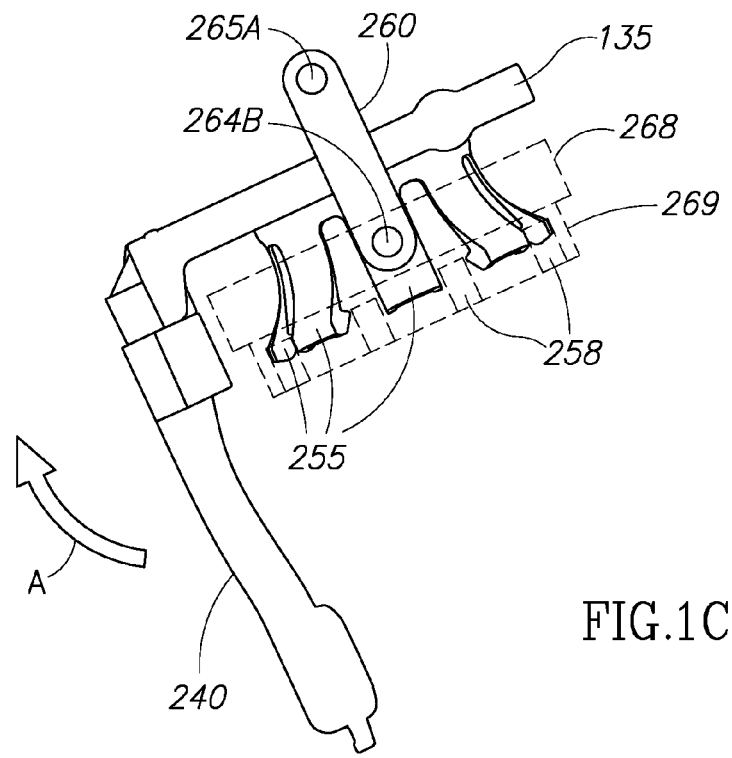
FIGS. 1C and 1D are cross-sectional views of two states of the pronged clamp of FIG. 1A.
Figure 1D:
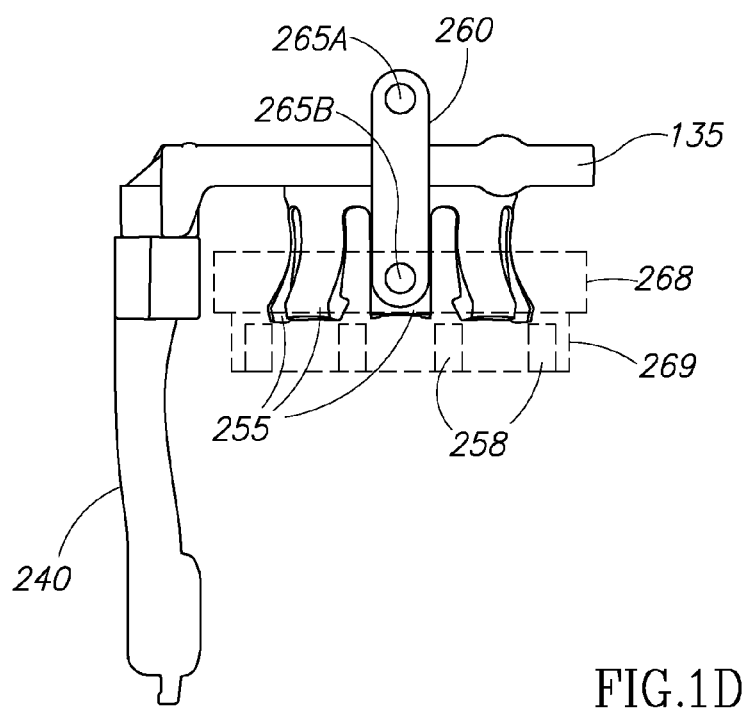

Reference is now also made to FIGS. 1C and 1D which illustrate alternative cross sectional views of assembly 130 without bottle 170 in order to afford a fuller view of the elements of assembly 130 that effect its attachment. As illustrated in both FIGS. 1C-1D, assembly 130 may also comprise pivot rod 260. Pivot rod 260 may extend between pivot points 265 on assembly 130. Pivot point 265A may be attached to the chassis of assembly 130 and may generally remain in the same position when lever 240 is pushed inwards by bottle 170. Accordingly, it will be appreciated that upon insertion of bottle 170, the attitude of pivot rod 260 may change as per the movement of pivot point 265B in the general direction of lever 240.

Assembly 130 may also comprise constricting ring 268. Constricting ring 268 may be generally square in shape with a hollow center, and may generally be positioned in parallel to carbonating head lower 135. As shown in FIGS. 1B and 1C, in an "open" state, when inserting bottle 170, constricting ring 268 may be positioned just underneath platform 135, thus encompassing the upper portions of prongs 255. It will be appreciated that although FIGS. 1C and 1D may represent cross sectional views, ring 268 may generally constitute a ring around prongs 255 and the mouth of bottle 170.

As discussed hereinabove, it will be appreciated that since pivot point 265B may be attached to ring 268, it may move in generally the same direction as insertion lever 240. Accordingly, when bottle 170 may be pressed against lever 240 in the direction of Arrow A (FIG. 1C) by a user, the differential between pivot points 265A and 265B may lower ring 268, thereby constricting pronged clamp 250 to hold bottle 170 in place underneath platform 135.

It will be appreciated that lever 240 may be positioned to allow bottle 170 to snugly fit against it when inserted into pronged clamp 250. This may reduce slippage during the insertion process of bottle 170 and may therefore prevent incidental breakage of parts of assembly 130. In accordance with a preferred embodiment of the present invention, lever 240 may be positioned such that a space of no more than 0.5 mm may exist between lever 240 and bottle 170 when bottle 170 is properly positioned in clamp 250.

The clamping process may be understood by comparing FIGS. 1C and 1D. In FIG. 1C, pivot rod 260 may be positioned at an angle and ring 268 may be positioned adjacent to carbonating head lower 135. In FIG. 1D, pivot rod 260 may be generally vertical and there may be distance between ring 268 and carbonating head lower 135. As pivot rod 260 may move in the direction of Arrow A to a vertical position as in FIG. 1C, ring 268 may move away from carbonating head lower 135, thus constricting prongs 255. It will be appreciated flexible prongs 255 may comprise relatively thicker end elements to catch below a screw top of bottle 170 to facilitate the clamping process as ring 268 may be lowered.

It will be appreciated that the opening of a typical bottle 170 may be large enough that a prong 255 might accidentally fit inside when a user inserts bottle 170. In accordance with a preferred embodiment of the present invention, centering ring 269 may extend from underneath constricting ring 268. Centering ring 269 may comprise centering ribs 258 which may be positioned to guide bottle 170 into the center area of pronged clamp 250. Centering ribs 258 may be generally located behind the gaps between individual prongs 255 to prevent bottle 170 from "snagging" on a prong 255 as it may be inserted.

Figure 1E:
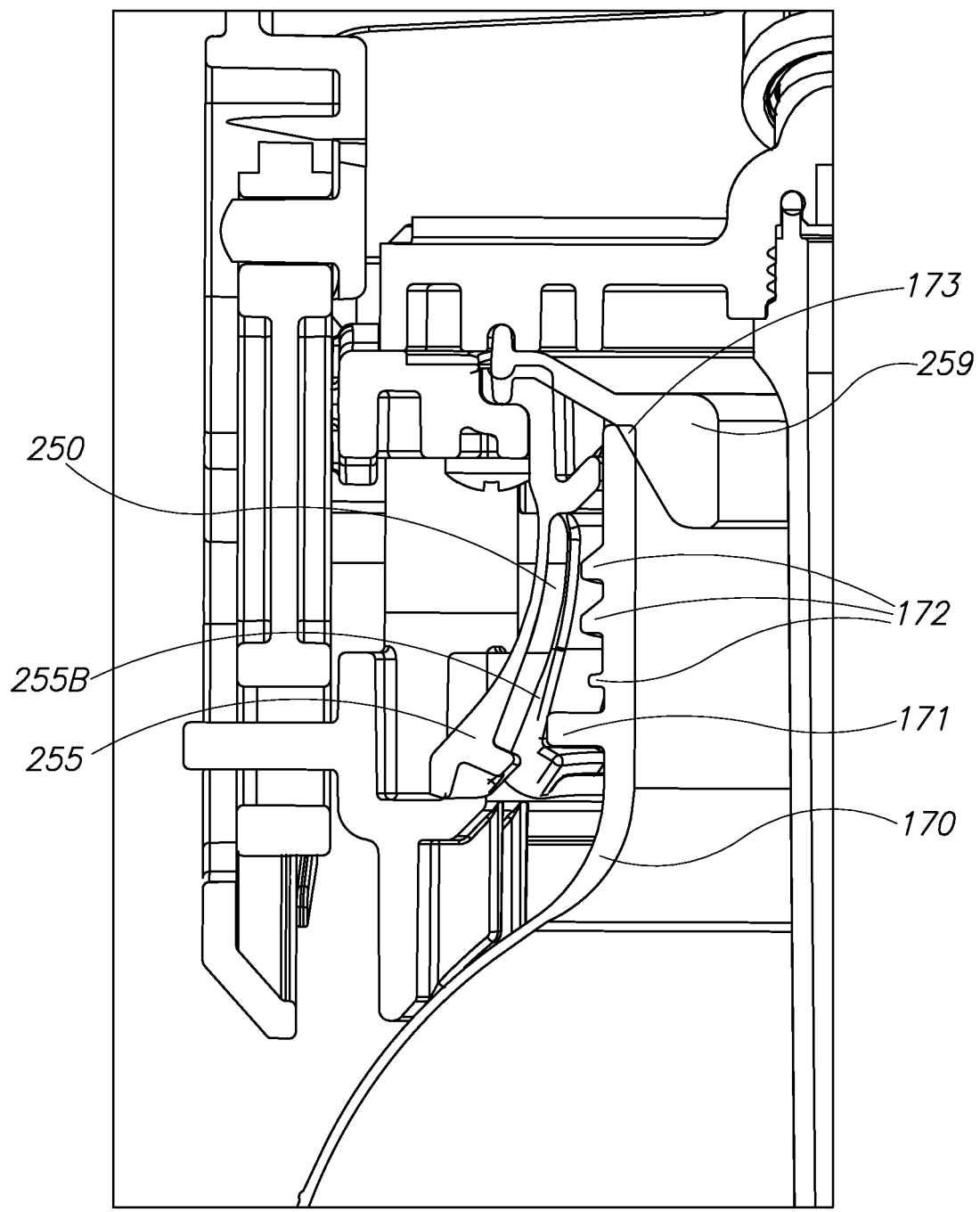
FIG. 1E is a close up view of the clamp of FIG. 1A clamped to a bottle.

Reference is now made to FIG. 1E which illustrates a cross sectional view of a bottle 170 as held by pronged clamp 250. Prong 255A may represent the position of one of prongs 255 when pronged clamp 250 may be engaged; conversely, prong 255B may represent the position of the same prong 255 when clamp 250 is not engaged. Bottle 170 may comprise bottle ring 171, threads 172 and bottle lip 173. Bottle ring 171 may represent a ring extending around the spout of a typical plastic bottle. Seal 259 may represent a flexible material positioned around the opening of bottle 170.

As illustrated in FIG. 1E, when pronged clamp 250 is engaged, it may exert a force upwards from underneath bottle ring 171, thereby causing bottle lip 173 to extend into seal 259. It will be appreciated that seal 259 may be configured to allow access to the contents of bottle 170 from assembly 130 for the purposes of carbonation and subsequent venting of pressurized $CO_2$. Accordingly, when constricted by constricting ring 268, pronged clamp 250 may clamp and seal the opening of bottle 170 against seal 259 such that bottle 170 may only be vented via assembly 130. As discussed hereinabove, prior art versions of assembly 130 may typically have two release valves, each configured to open under different circumstances. For example, exhaust valve 210 (FIG. 1A) may be configured to vent when the pressure build up inside bottle 170 indicates that the carbonation pressure (typically 8 bars) has been reached. Safety valve 220 may be configured to vent as a safety measure when the pressure inside bottle 170 exceeds recommended levels, for example, 11 bars of pressure.

Figure 2A:
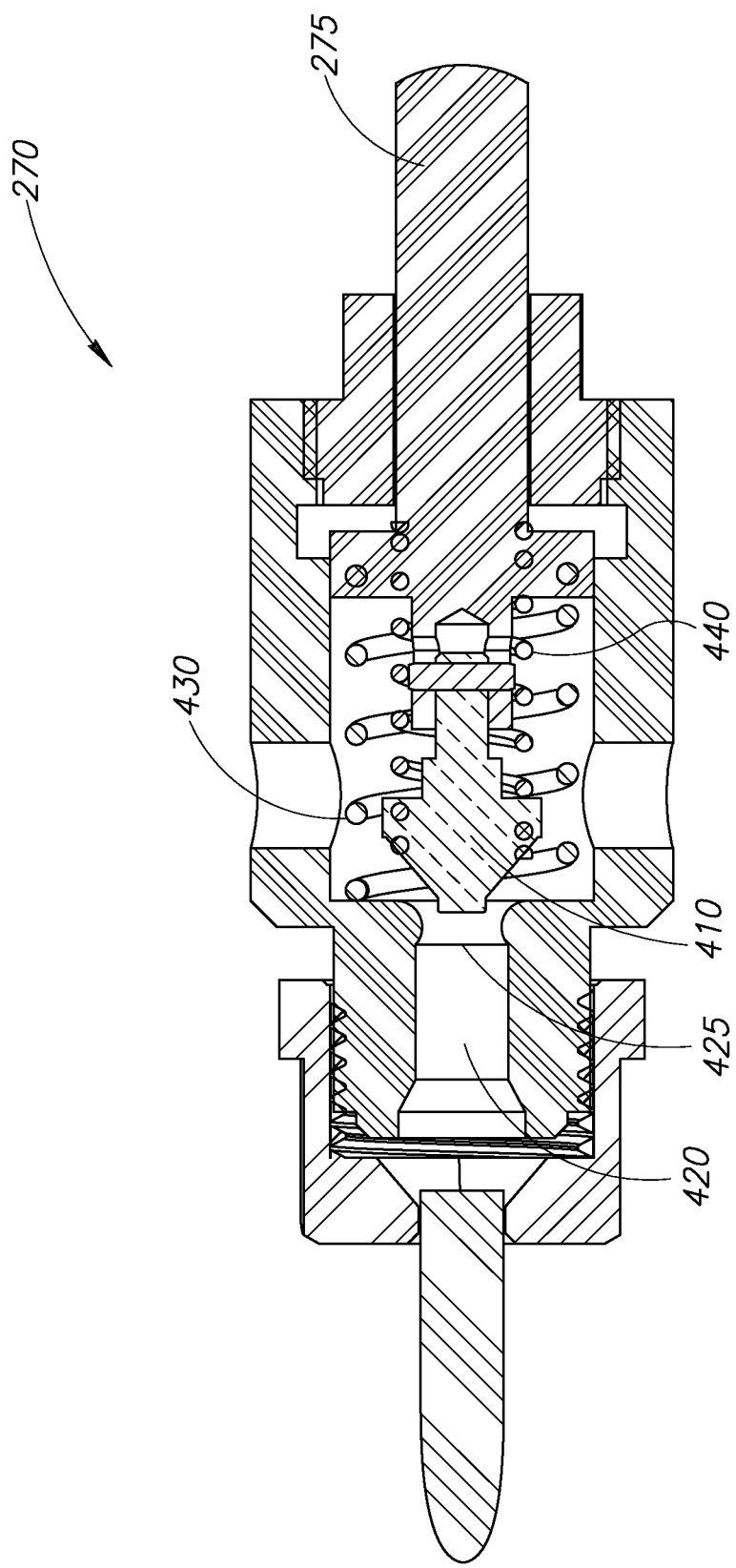
FIGS. 2A and 2B are schematic illustrations of two alternative embodiments of a double action normally open valve.

Applicants have realized that additional safety measures may be required to prevent the buildup of excess pressure during an automated process. In accordance with a preferred embodiment of the present invention, a soda machine having pronged clamp 250 may also comprise a normally open double action safety valve 270. Reference is now made to FIG. 2A which illustrates an exemplary double action safety valve 270 in a normal open state. As is discussed in detail hereinbelow, the fact that double action safety valve 270 may be open in its normal state (as opposed to valves 210 and 220 which may normally be closed) may provide an additional level of safety for the operation of the soda machine. The soda machine may be configured to close safety valve 270 as part of the carbonation process, and to re-open it when the process finishes.

Double action safety valve 270 may comprise contact pin 275, poppet 410, aperture 425, conduit 420 and springs 430 and 440. In its normal open state, as shown in FIG. 2A, the tension of spring 430 may serve to prevent poppet 410 from closing aperture 420. However, when, as described hereinabove, contact pin 275 may be depressed during carbonation, such as by a cam defining the carbonation process, described in more detail hereinbelow, it may be pushed into valve 270, thereby exerting sufficient force on spring 430 to allow poppet 410 to slide into position to close aperture 425. It will be appreciated that conduit 420 may represent tubing (not shown) that may connect with carbonation head assembly 130. Accordingly, since valve 270 may be normally open even when connected to a bottle 170, it may provide an additional safeguard to the operation of machine 100 by ensuring that the contents of an attached bottle 170 may always be vented unless the carbonation process is expressly active at the time.

Upon completion of the carbonation process, contact pin 275 may no longer be depressed. Accordingly, at that point, contact pin 275 may no longer exert sufficient force on spring 430 to prevent it from moving poppet 410 to open aperture 420, thus returning safety valve 270 to its normally open state.

In accordance with a preferred embodiment of the present invention, safety valve 270 may be further configured to open during the carbonation process itself if for whatever reason the pressure in bottle 170 may exceed a pre-determined limit. For example, spring 440 may be configured such that if the pressure inside bottle 170 exceeds 11 bars of pressure, poppet 410 may be moved backwards to open aperture 425, thusly venting bottle 170. It will be appreciated that 11 bars of pressure may be sufficient to move poppet 410 even if contact pin 275 is depressed by a cam. It will further be appreciated that the configuration disclosed hereinabove may be exemplary; the present invention may include other suitable configurations as may be required for specific implementations.

Figure 2B:
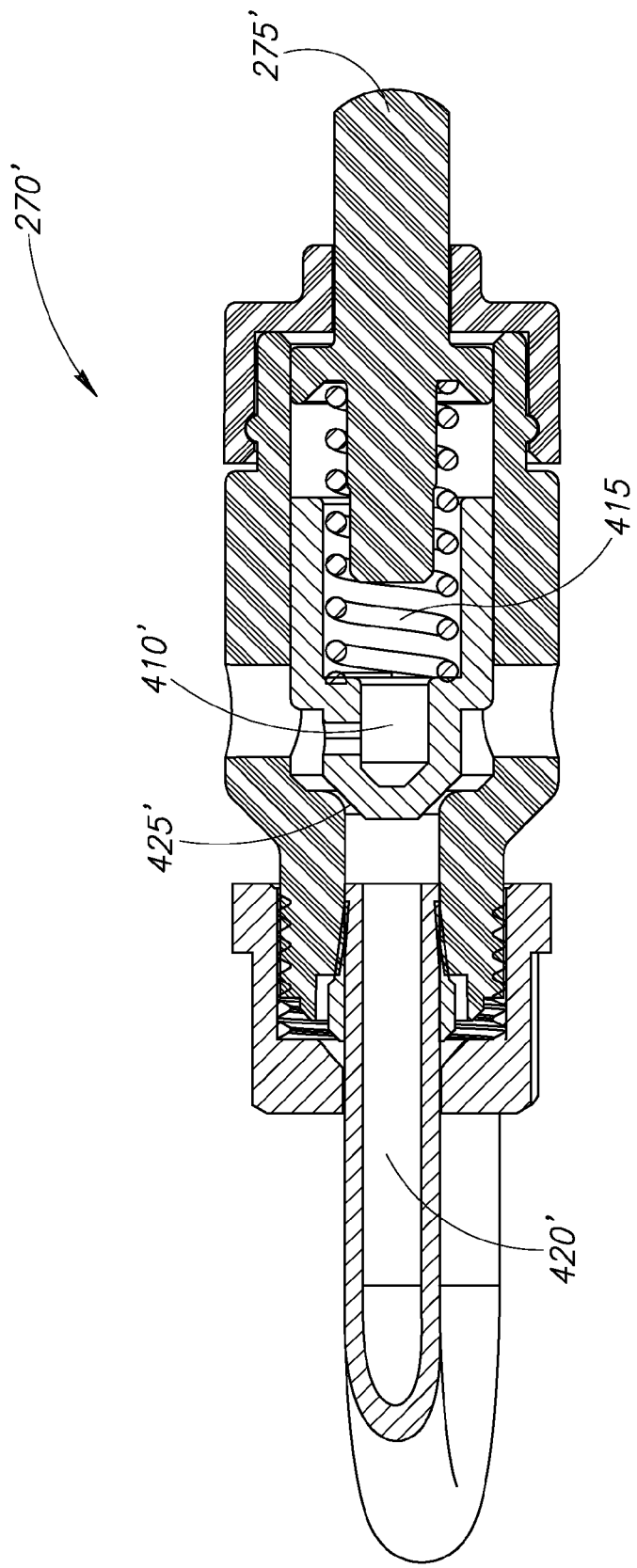

Reference is now made to FIG. 2B which illustrated an alternative embodiment of double action safety valve 270, known from herein as double action safety valve 270'. Double action safety valve 270' may comprise contact pin 275', poppet 410', aperture 425', conduit 420' and spring 415. In normal operative mode as described hereinabove, during carbonation, pin 275' may exert pressure on spring 415 which may push poppet 410' in order to close aperture 425'. It will be appreciated that spring 415 may be also set to a pre-determined pressure so that when aperture 425' is closed and when the buildup of pressure inside bottle 170 exceeds pre-determined limits (typically 11 bars), spring 415 may release poppet 410' and therefore re-open aperture 425' to allow for venting of excess gas.

Applicant has realized that the pronged clamp of the present invention may be utilized in a manually operated soda machine or in an automated soda machine.

It will be appreciated that in order to provide automated operation, a home soda machine must comprise means for receiving electrical input via, for example, a connection with the mains or a battery. Understandably, the introduction of electricity into any machine is not without risk. Accordingly, as opposed to a manually operated home soda machine, an automated version may require built-in safeguards to prevent damage from electricity. However, it will also be appreciated that in addition to the exposure to direct damage caused by electricity, adding an electrical component to the carbonation process may also indirectly add to the risks of using pressurized $CO_2$. If, for whatever reason, there is a power interruption while the $CO_2$ canister is open, there may be considerable exposure to explosion from continuing the carbonation process past safe levels of pressure. For example, in the prior art system disclosed in EP 1351758, if the power is cut while the cam assembly is in position to mechanically open the $CO_2$ canister, excess pressure may build up in the soda machine with undesirable results.

Figure 3A:
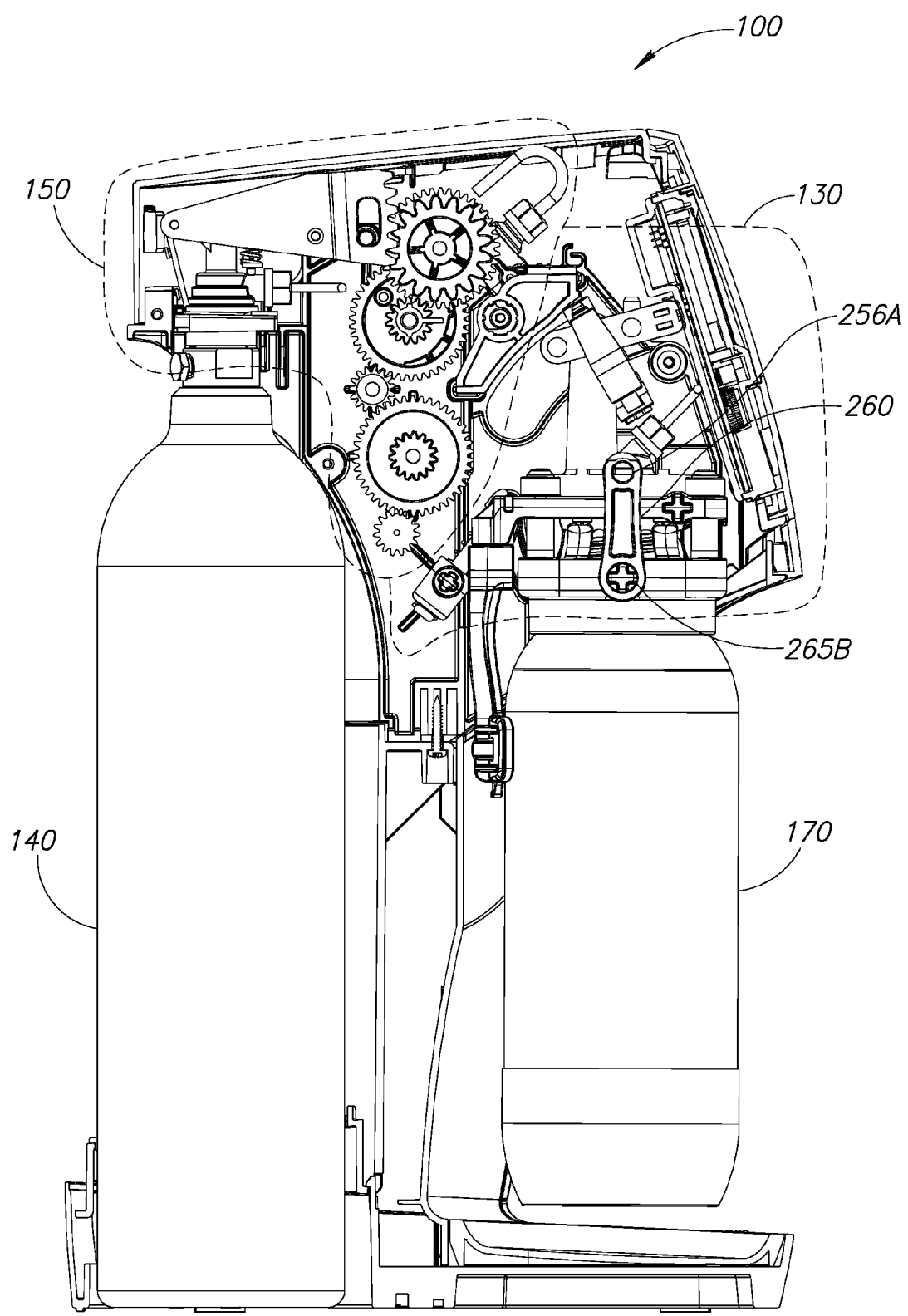
FIGS. 3A and 3B are cross sectional views of a novel semi-automated home soda machine, constructed and operative in accordance with a preferred embodiment of the present invention.
Figure 3B:
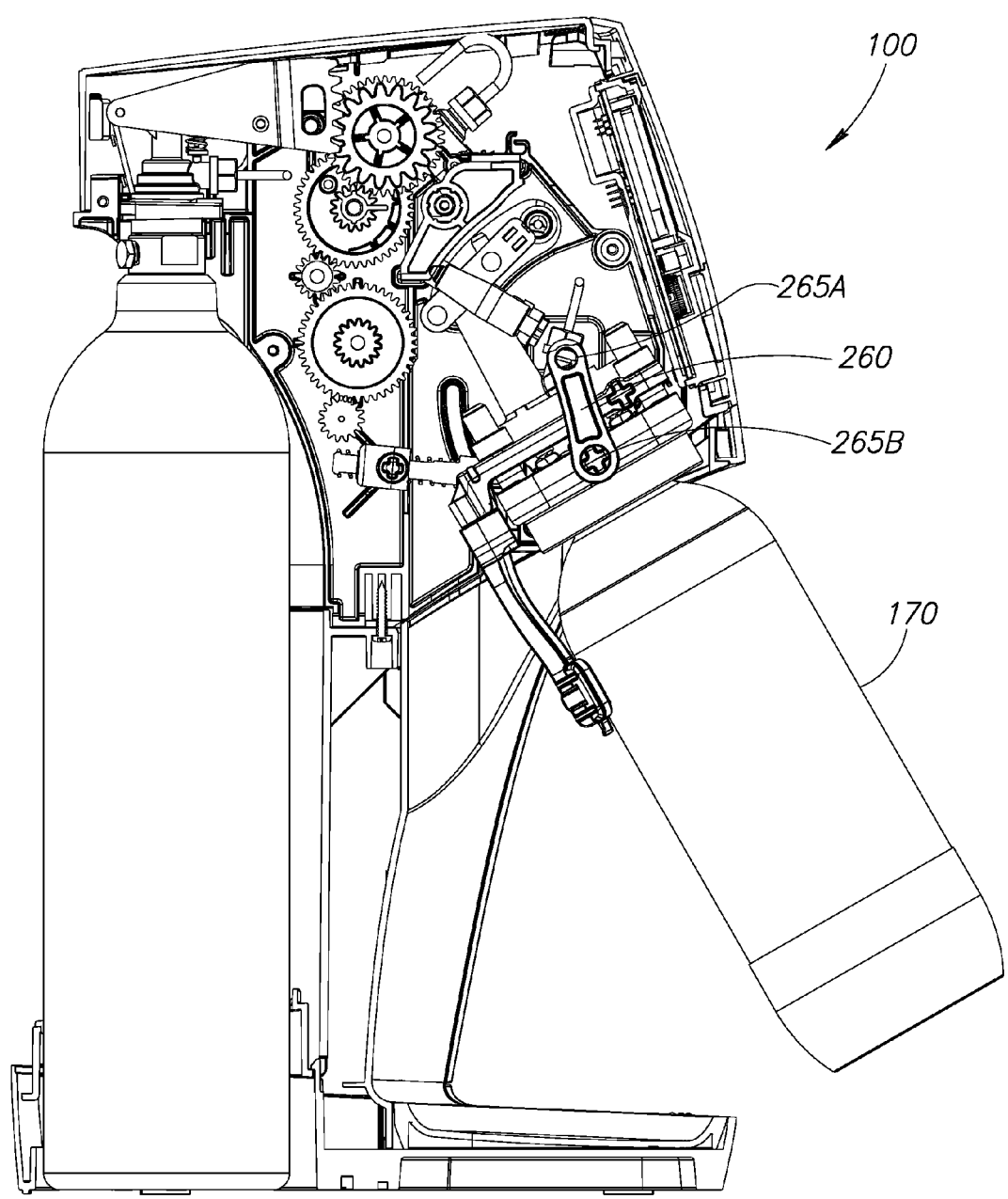

Accordingly, Applicant has realized that an automated home soda machine may require one or more additional safeguards to ensure that the supply of pressurized $CO_2$ may be terminated in the event of an electrical outage during operation. Reference is now made to FIGS. 3A and 3B which illustrate two states of a novel, semi-automated home soda machine 100, designed and operative in accordance with a preferred embodiment of the present invention. FIG. 3A illustrates a machine 100 with an attached water bottle 170; whereas FIG. 3B illustrates machine 100 at a point during the process of attaching bottle 170. Semi-automated home soda machine 100 may comprise carbonation head assembly 130, $CO_2$ canister 140, and carbonation gear assembly 150. Carbonation head assembly 130 may function in a generally similar manner as the assembly disclosed in U.S. Pat. No. 7,975,988. However, assembly 130 may also comprise additional features/functionality as may be disclosed hereinbelow.

To operate home soda machine 100, a user may first manually attach water bottle 170 by fitting it at an angle to carbonation head assembly 130 as shown in FIG. 1B. A carbonation process may then be initiated via a set of one or more controls (not shown). The control set may comprise a control to initiate carbonation; one or more additional controls may be configured to facilitate the selection of a desired level of carbonization (i.e. "weak/low", "regular/medium", "strong/high"). The present invention may include any suitable controls such as are known in the art, including, for example, switches, pushbuttons, dials, etc.

Figure 4A:
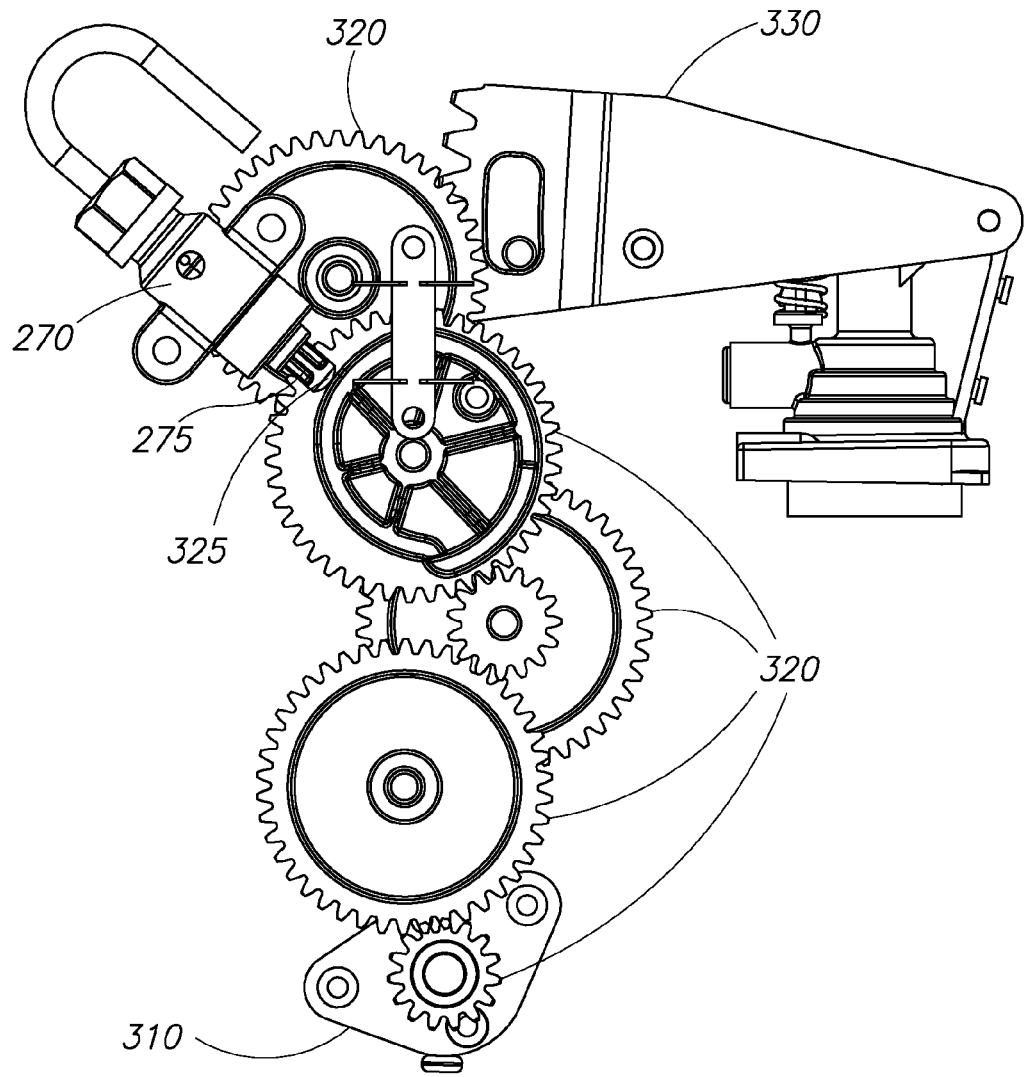
FIGS. 4A and 4B are close up views of the carbonating gear assembly of FIGS. 3A and 3B.

Reference is now made to FIG. 4A which illustrates carbonation gear assembly 150 as it may be positioned within an exemplary home soda machine 100. Carbonation gear assembly 150 may comprise motor 310, interlocking gears 320, carbonation cam 325 and carbonation lever 330. Motor 310 may be configured to operate interlocking gears 320, which, in turn, may depress carbonation lever 330. It will be appreciated that the arrangement of interlocking gears 320 may be exemplary; any suitable arrangement such as known in the art to generate the necessary force required to depress lever 330 may be included in the present invention. Carbonation lever 330 may be configured such that when depressed, it may open a release valve on canister 140 (FIG. 3A) to release $CO_2$ into tubing (not shown) that may introduce it into bottle 170 via carbonation injector 230 (FIG. 1A).

Figure 4B:
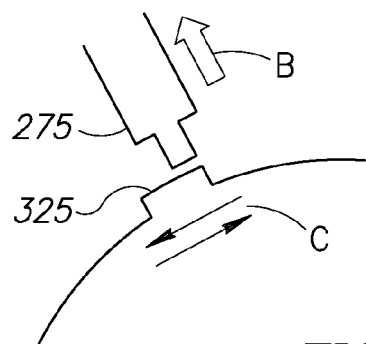

Reference is now also made to FIG. 4B which illustrates a close up view of an exemplary carbonation cam 325. Carbonation cam 325 may be, for example, a raised area on one of interlocking gears 320. It will be appreciated however, that any suitable cam may be included in the present invention. Double action safety valve 270 may comprise contact pin 275 and may be positioned in proximity to carbonation cam 325. Assembly 150 may be configured such that, when not in use, contact pin 275 may not be in direct contact with cam 325. However, when assembly 150 is to be activated as part of the carbonation process, motor 310 may rotate interlocking gears 320, thus placing cam 325 in direct contact with contact pin 275, effectively pushing contact pin 275 in the direction of Arrow B. One or more sensors (not shown) may be positioned on one or both ends of cam 325 to sense when contact pin 275 makes contact with cam 325. It will be appreciated that any suitable sensors such as are known in the art may be included in the present invention. For example, the invention may include optical, proximity, and/or mechanical sensors.

It will be appreciated that motor 310 may rotate gears 320 such that cam 325 may be in contact with contact pin 275 and lever 330 may be lowered towards canister 140 to release $CO_2$ for introduction into assembly 130. In accordance with a preferred embodiment of the present invention, during the carbonation process, motor 310 may rotate gears 320 back and forth one or more times, to thereby lower and raise lever 330 to release bursts of $CO_2$ from canister 140. It will be appreciated that the sensor(s) on cam 325 may signal when contact pin 275 is close to an edge of cam 325, at which point motor 310 may reverse direction as per Arrows C (FIG. 4B), thus effectively maintaining contact between contact pin 275 and cam 325 during the carbonation process. Upon the completion of the carbonation process, motor 310 may rotate gears 320 to raise lever 330 and to terminate contact between contact pin 275 and cam 325.

It will, however, be appreciated that the soda machine may be configured to use more than one type of gas canister 140. For example, some canisters 140 may have activating pins that require 30 newtons of force to open, whereas other canisters 140 may have activating pins that require as much as 150 newtons. Applicants have realized that it may not be possible to configure a spring mechanism for lever 330 that may be suitable for every possible level of pressure required to open canister 140. Such functionality may interfere with the normal operation of machine 100 where carbonation lever 330 must be applied with sufficient force to depress the activation pin of canister 140. Accordingly, in accordance with a preferred embodiment of the present invention, the spring mechanism may be configured to yield under higher pressures such as when the force provided by the activation pin may be 30 newtons or more.

As discussed hereinabove, it may be possible that a power outage may occur during the carbonation process while carbonation lever 330 (FIG. 4A) is depressed. In accordance with another preferred embodiment of the present invention, carbonation lever 330 may also be configured with a spring mechanism that may leverage the pressure required to open canister 140. It will be appreciated that canisters 140 may be typically opened by depressing an activating pin. As a safety measure, it may typically require significant pressure to depress the activating pin to open canister 140. The spring mechanism in lever 330 may be configured such that, in the event of a power outage while lever 330 is depressed to open canister 140, the pressure naturally returned by the activating pin may be significant enough to overcome the inertial pressure of lever 330 when it is no longer powered by motor 310.

Figure 5:
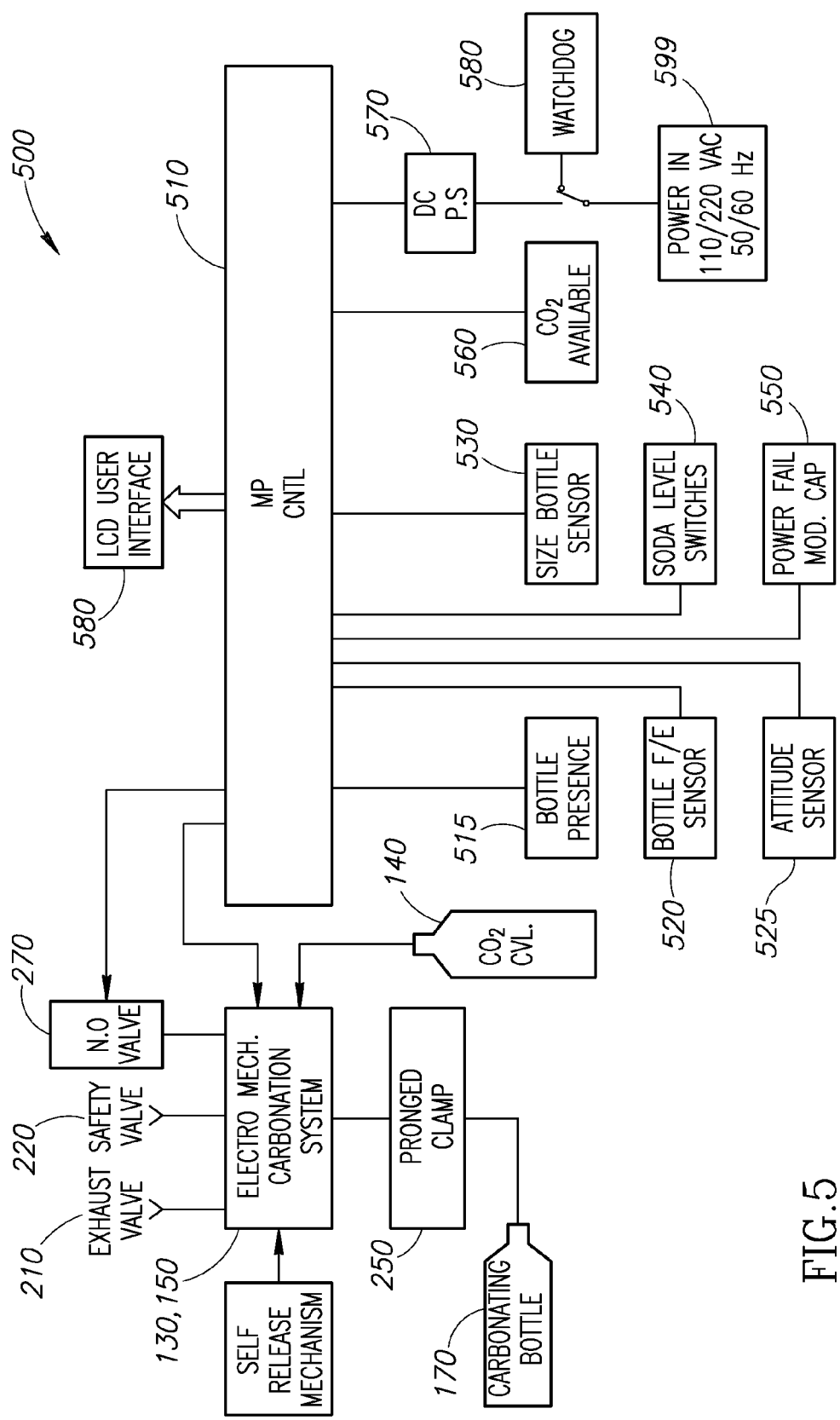
FIG. 5 is a schematic illustration of the semi-automated home soda machine in FIGS. 3A and 3B.

It will be appreciated that features and functionality disclosed hereinabove may require a processor/controller unit with electrical input. Reference is now made to FIG. 5 which illustrates an exemplary architecture for integrating such a unit within home soda machine 100. Architecture 500 may comprise mechanical features such as carbonation head assembly 130, carbonation gear assembly 150, and pronged clamp 250 to introduce $CO_2$ from canister 140 to bottle 170 to produce carbonated water. Architecture 500 may also comprise controller unit 510 to automate and control the carbonation process. Controller unit 510 may be any suitable device such as known in the art that may generally be capable of providing the relevant functionality as described herein.

Controller unit 510 may receive input from one or more sensors, for example, bottle presence sensor 515, bottle full/empty sensor 520, attitude sensor 525, bottle size sensor 530 and/or $CO_2$ available sensor 560. Sensor 515 may indicate whether or not a bottle 170 has been properly inserted and clamped by pronged clamp 250. Sensor 520 may indicate whether or not bottle 170 is full. Sensor 525 may indicate whether or not home soda machine 100 is positioned in an upright manner. Sensor 530 may indicate the size of bottle 170, for example, either a half liter or a full liter. $CO_2$ available sensor 560 may indicate whether or not there is $CO_2$ in canister 140. It will be appreciated that sensors 515, 520, 525, 530 and 560 may be implemented using any suitable sensors such as known in the art.

It will be appreciated that, based on input from these sensors, unit 510 may abort or adjust a carbonation process. For example, if sensor 515 cannot detect bottle 170, controller unit 510 may abort the process. Controller unit 510 may also abort the process when sensor 525 indicates that home bottle 170 is not positioned in an upright manner. Carbonation in such circumstances may be adversely affected by gravity. Furthermore, removing a freshly carbonated bottle 170 from a non-upright position may be potentially dangerous and in any case would certainly cause undesirable spillage.

In accordance with another preferred embodiment of the present invention, home soda machine 100 may be configured with capacitor 550 to store an electrical charge during operation of machine 100. If a power outage occurs during the carbonation process, unit 510 may instruct motor 310 to rotate gears 320 in such a manner as to open double action safety valve 270 and to raise lever 330 from connection with canister 140. The stored charge may provide sufficient power to motor 310 to execute the instructions.

Controller unit 510 may also use input from sensor 530 to adjust the process in accordance with the size of bottle 170. It will be appreciated that the present invention may include other sensors as well. For example, as discussed hereinabove, one or more sensors may be used to ensure that plunger 275 may be in contact with cam 325 during the carbonation process. It will similarly be appreciated that the present invention may be configured without some or all of the sensors discussed herein.

As discussed hereinabove, home soda machine 100 may be configured to provide a variety of carbonation options depending on the preferences of its users. Such preferences may be indicated via soda level switches 540 and/or LCD user interface 590. It will be appreciated that any other suitable controls for indicating preferences and/or initiating the carbonation process may also be included in the present invention. Controller 510 may be configured to continue the carbonation process until the water in water bottle 160 is sufficiently carbonated in accordance with the preferences selected by the user.

Accordingly, controller unit 510 may provide a variety of instructions to motor 310 based on the preferences selected by the user. For example, home soda machine 100 may be configured to provide "weak" carbonation with three timed bursts of $CO_2$; medium carbonation with four bursts of $CO_2$; and strong carbonation with five bursts of $CO_2$. Accordingly, if a user selects "medium", unit 510 may instruct motor 310 to rotate interlocking gears 320 such that lever 330 may be depressed four times. It will be appreciated that the number of bursts listed hereinabove for each carbonization strength may be exemplary; the invention may be configured to provide a requested strength in accordance with any suitable combination of number/length/interval of bursts.

In accordance with another preferred embodiment of the present invention, home soda machine 100 may be configured with a watchdog mechanism 580 positioned between power input 599 and power supply 570. Watchdog mechanism 580 may be configured to monitor the length of time that the carbonation process has been running. In the event that the timing of the carbonation process exceeds a threshold, watchdog mechanism 580 may cut off the input from power input 599. For example, home soda machine 100 may be configured to provide a maximum of 30 seconds of carbonation under the assumption that any more may result in unsafe conditions. In the event that continuous usage occurs for longer than a configurable threshold such as 30 seconds, it may be assumed that a "runaway" event may be occurring. Accordingly, watchdog mechanism 580 may shut down the process in a brutal fashion by cutting off electrical input.

It will be appreciated that after carbonation, the contents of water bottle 170 may be under significant pressure. It will therefore be appreciated that an immediate opening of the seal formed by pronged clamp 250 and water bottle 170 may create a "rocket effect" when bottle 170 is removed from machine 100. However, as disclosed hereinabove, double action safety valve 270 may revert to a normal open state whenever carbonation is not in process. Thus bottle 170 may be at least partially vented before its removal to mitigate the "rocket" effect.

Figure 6:
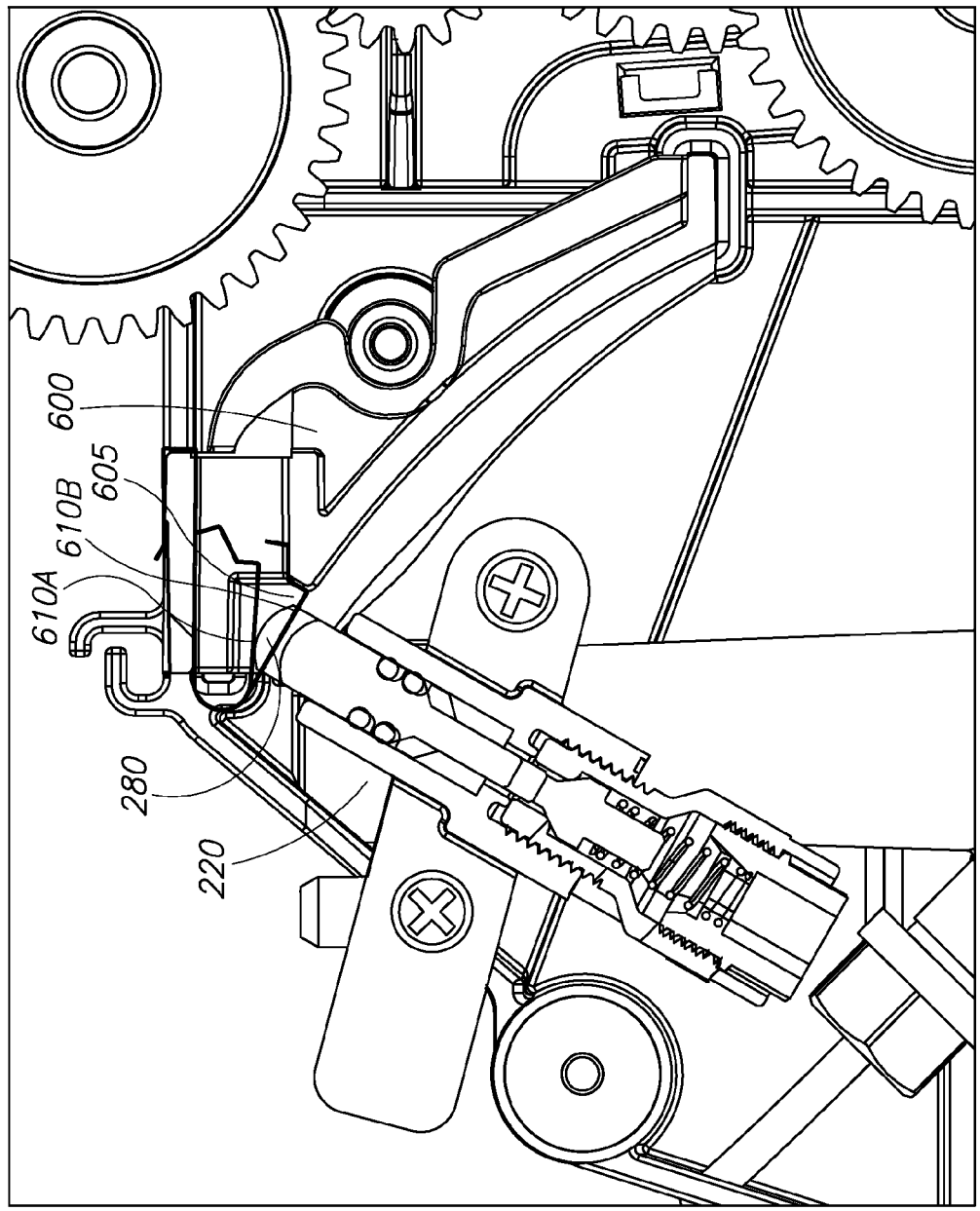
FIG. 6 is a schematic illustration of a locking mechanism safety feature for the semi-automated home soda machine in FIGS. 3A and 3B.

Reference is now made to FIG. 6 which illustrates an additional safety feature designed to prevent such a "rocket effect" occurring. In accordance with a preferred embodiment of the present invention, safety valve 220 may be leveraged to provide a locking mechanism, to prevent the release of bottle 170 during an active carbonation process. FIG. 6 illustrates a novel cam 600 comprising a recessed contact area 605. Recessed contact area 605 may be covered by a flat spring 610 which, together, may provide a mechanical stop to the movement of bottle 170. As shown in FIG. 6, when activating pin 280 is in contact with cam 600 during the carbonation process, flat spring 610 may be depressed as depicted by flat spring 610A. Flat spring 610B may indicate the normal state of flat spring 610, when the carbonation process is over and there is no longer any pressure in the bottle 170. It will be appreciated that as illustrated by comparing FIG. 1B, cam 600 may be generally static when bottle 170 is released, whereas valve 220 may generally swing outwardly along with bottle 170. Accordingly, if activating pin 280 is lodged in recessed contact area 280, it may prevent such motion, essentially locking bottle 170 in place while carbonation is in process and there is pressure in bottle 170.

It will be appreciated that the present invention may include other such locking mechanisms for other home soda machines that may or may not be configured with safety valve 220 (FIG. 2). For example, mechanical, non-automated home soda machines may not require a novel cam 600 and spring 610, but may still be configured with pronged clamp 250. For such machines, any suitable locking mechanism such as known in the art may be used to prevent a user from releasing bottle 170 while simultaneously initiating carbonation. In accordance with a preferred embodiment of the present invention, mechanical home soda machines may be configured with a safety lock that may be engaged as soon bottle 170 is clasped by pronged clasp 250. In order to release bottle 170, the user may first have to expressly unlock the safety lock, thus enabling at least partial release of built up $CO_2$ prior to bottle release and effectively preventing the rocket effect.

Figure 7A:
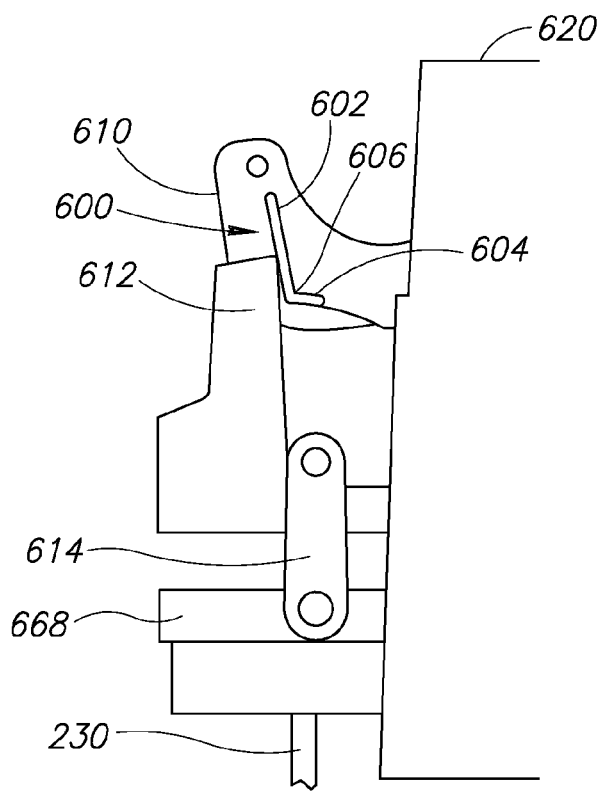
FIGS. 7A and 7B are schematic illustrations of an alternative locking mechanism safety feature for a soda machine in two states.
Figure 7B:
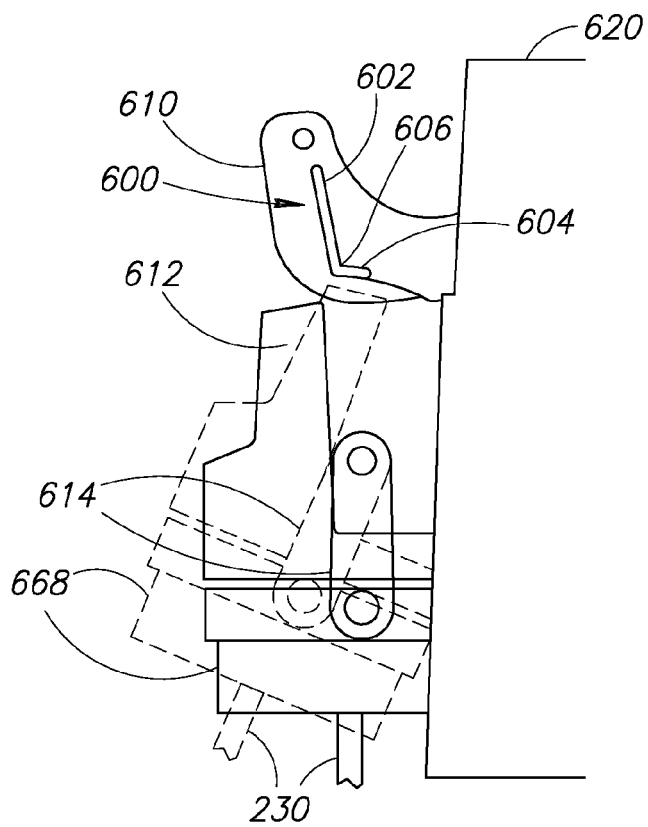

Reference is now made to FIGS. 7A and 7B, which illustrate an exemplary locking mechanism for a non-automated machine. In this embodiment, the mechanical stop may be a rib 600 formed on a lever 610 of the machine. Rib 600 may have an elbow shape, with a relatively vertical portion 602, a relatively horizontal portion 604 and an elbow point 606. In addition, this embodiment may comprise a pronged clamp, denoted by a constricting ring 668, a pivot rod 614 and an assembly with an extension 612 which may move with respect to rib 600.

In a locked state, shown in FIG. 7A, lever 610 may be lowered with respect to a housing 620. In this position, bottle 170 may be engaged by the pronged clamp and thus, may be upright. Constricting ring 668 may thus be horizontal and thus, extension 612, which may be perpendicular to constricting ring 668, may be vertical. Lever 610 may be located such that extension 612 may extend past rib portion 602. Since rib portion 602 may jut out from lever 610, rib portion 602 may prevent extension 612 from rotating and thus, may prevent a user from removing bottle 170 from the pronged clamp which is constricted by constricting ring 668.

When lever 610 may be raised, as shown in FIG. 7B, it may raise rib 600 with respect to extension 612. Vertical rib portion 602 may be raised such that the tip of extension 612 may pass elbow point 606. As a result, the tip of extension 612 may no longer be constrained by vertical rib portion 602. In this state, the bottle as held by the pronged clamp may be rotated and thus, constricting rib 668 is shown in both a vertical and a rotated state.

Thus, in this embodiment, only once lever 610 may be raised, such as may happen after carbonation, can the bottle be removed from the pronged clamp. Rib 600 may provide a mechanical stop to the rotation of the bottle. In this manner, the removal of the bottle after carbonation may occur a few seconds after carbonation finishes, which may enable sufficient excess gasses to escape to prevent the rocket effect.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A pronged clamp apparatus for attaching a soda bottle to a home use carbonation machine, the apparatus comprising:
   a prong assembly to receive and position said bottle to said carbonation machine at a non-upright position prior to carbonation and to attach said bottle to said carbonation machine when a user moves the bottle towards an upright position; and
   a locking mechanism to lock said bottle to said carbonation machine in said upright position at least during carbonation.

2. The apparatus according to claim 1 and wherein said prong assembly comprises:
   prongs to receive and position said bottle,
   a constricting ring with centering ribs to guide said bottle into said pronged clamp during insertion and to constrict said prongs; and
   a pivot rod attached said constricting ring and to said home use carbonation machine to enable said constriction of said prongs when said user moves said bottle towards said upright position.

3. The apparatus according to claim 2 and also comprising a flexible seal to facilitate a closed carbonation environment and wherein said constricting ring constricts said prongs underneath a ringed extension of said bottle thereby lifting said bottle towards a seal to clamp said bottle to said flexible seal.

4. The apparatus according to claim 1 and also wherein said locking mechanism is a mechanical stop.

5. The apparatus according to claim 4 and also wherein said mechanical stop is a recessed area in a cam of said carbonation machine, said recessed area receiving an activator pin connected to said pronged clamp during said carbonation.

6. The apparatus according to claim 4 and also wherein said mechanical stop is a rib of a lever which stops an extension of said pronged clamp from tilting during said carbonation.

7. The pronged clamp apparatus according to claim 3 and wherein said ringed extension is around a spout of said bottle.

8. The pronged clamp apparatus according to claim 7 and wherein said ringed extension is near threads around said spout.

* * * * *